(No Model.) 2 Sheets—Sheet 1.
I. W. HEYSINGER.
CONDUIT FOR CABLE AND ELECTRIC RAILWAYS.
No. 325,173. Patented Aug. 25, 1885.
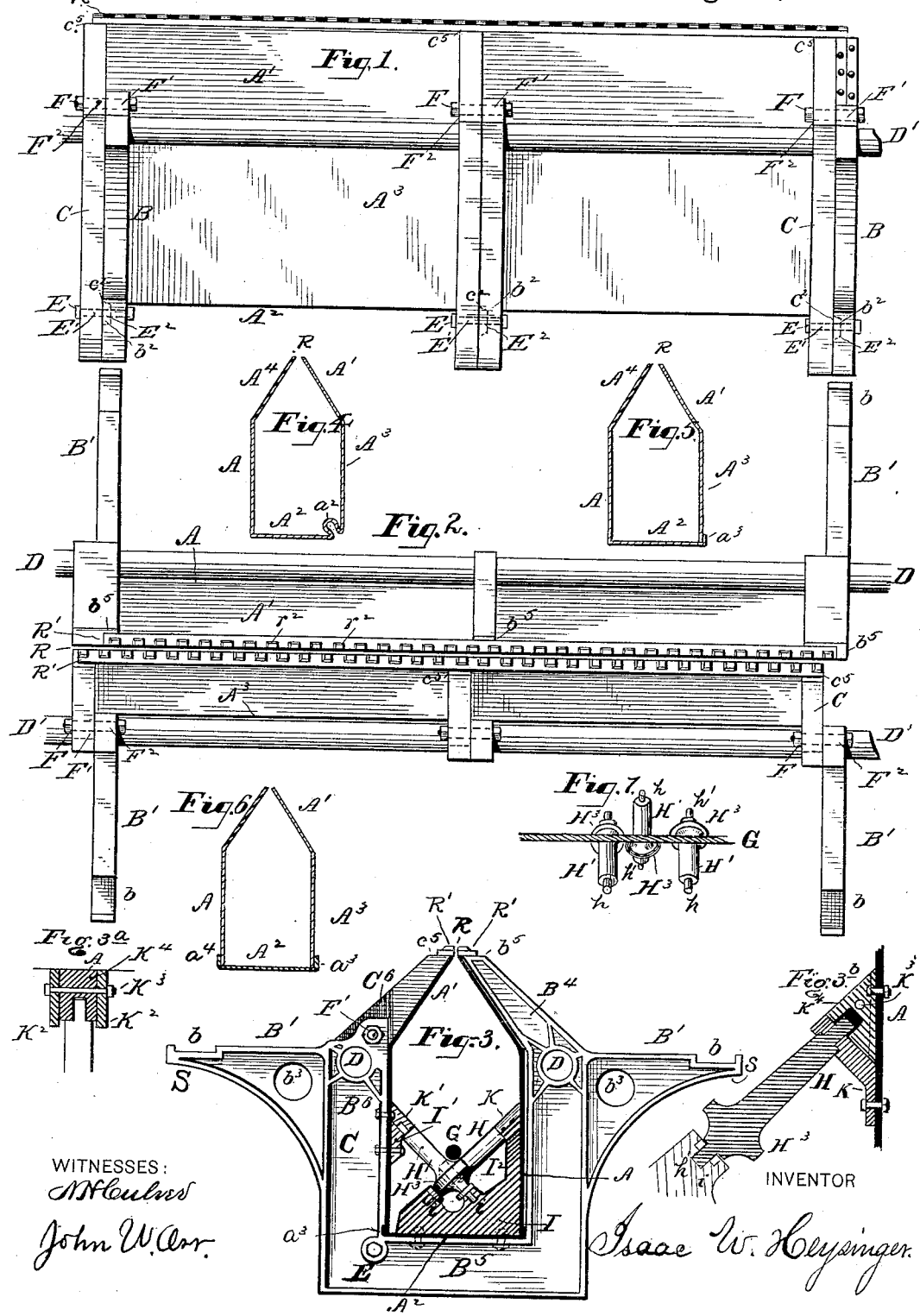

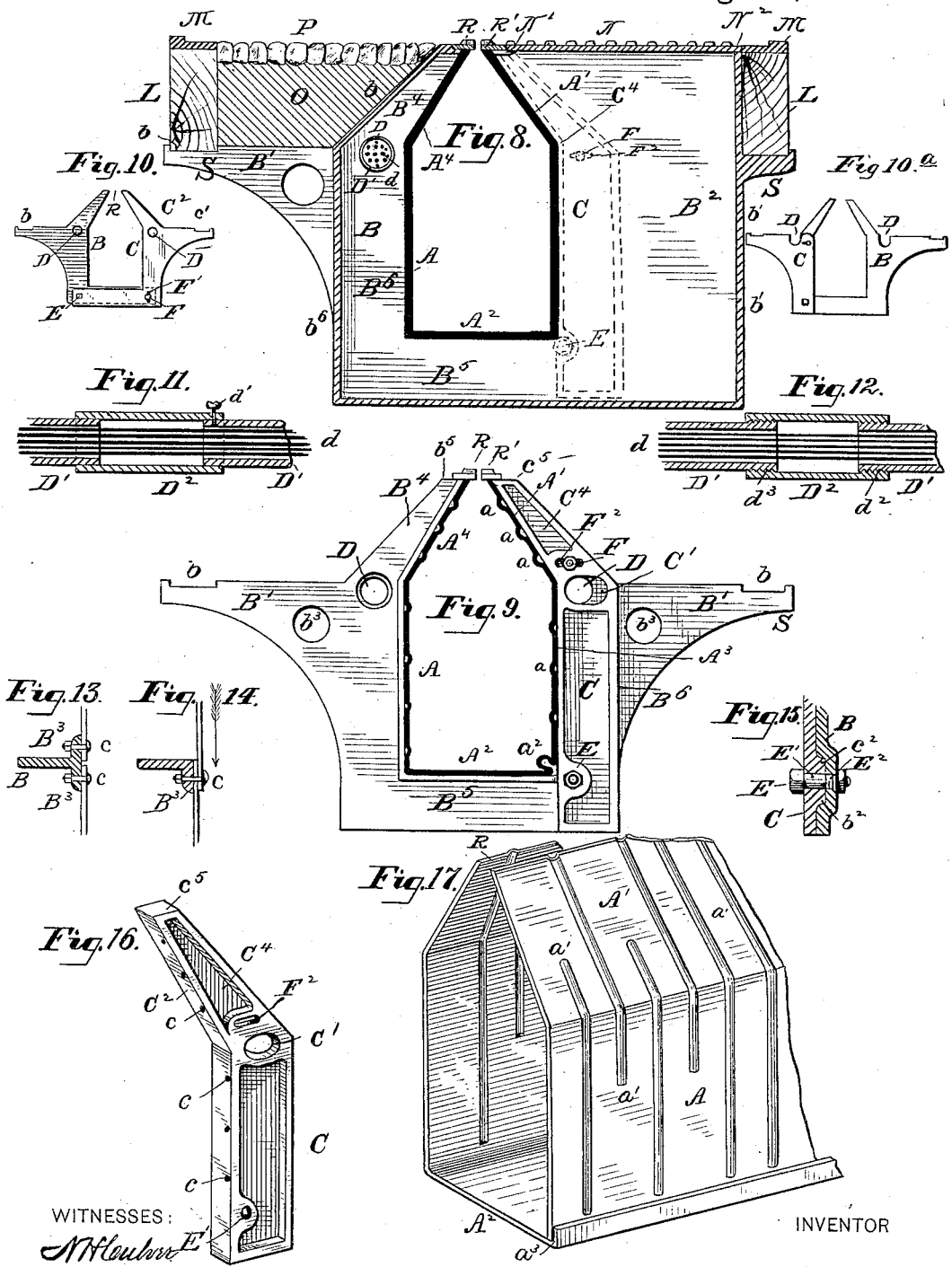

UNITED STATES PATENT OFFICE.

ISAAC W. HEYSINGER, OF PHILADELPHIA, PENNSYLVANIA.

CONDUIT FOR CABLE AND ELECTRIC RAILWAYS.

SPECIFICATION forming part of Letters Patent No. 325,173, dated August 25, 1885.

Application filed April 22, 1885. (No model.)

*To all whom it may concern:*

Be it known that I, ISAAC W. HEYSINGER, of Philadelphia, in the county of Philadelphia and State of Pennsylvania, have invented a certain new and useful Improvement in Conduits for Cable and Electric Railways and for Electric Wires, &c., of which the following is a full, clear, and exact description, reference being had to the drawings accompanying and forming a part of this specification, in which—

Figure 1 is a side elevation of a conduit and its attached parts constructed according to the principles of my invention. Fig. 2 is a plan view of the same, the surface of the street having been removed to show the parts of the conduit, &c., in place. Fig. 3 is an end view of one of my conduits, showing the metal yoke which supports the bottom and one side of the sheet-metal conduit-tube, and behind it the hinged adjusting-frame, to which the opposite side of the said conduit-tube is attached, and which said frame by adjustment upon its pivot or hinged joint regulates the width of the slot in the top of the conduit. It also shows the diagonal sheaves or rollers upon which the cable is supported, and their attachments. Fig. 3$^a$ illustrates in sectional front view the method of detachably seating the upper spindles of the diagonal rollers, and Fig. 3$^b$ the same in side view. Fig. 4 is a view of the sheet-metal conduit-tube made in one piece, provided with the longitudinal corner corrugation $a^2$, to form a hinge or flexible joint upon which the adjustable frame C may act to open or close the grip-slot R. Fig. 5 shows the same provided with a lipped joint at $a^3$, to admit of motion of the movable side $A^3$ upon $a^3$ as a hinge. Fig. 6 shows the same with a double-lipped joint, so that each section of the conduit-tube is made in three pieces, and is built up as it is laid in the ground. This form is especially adapted for use with the form of conduit shown in Fig. 10, or where transportation is difficult, as the parts may be transported separately and rapidly built up in the ground. Fig. 7 shows the arrangement of the diagonal sheaves or rolls in a group of three, or they may be in pairs, and illustrates their operation with reference to the cable. Fig. 8 is a transverse vertical section of my invention, taken at a man-hole, and shows the method by which the interior parts of the cable and electric conduits are reached. Fig. 9 illustrates the operation of the yoke B and frame C, and the position of the yoke and frame is reversed from that shown in Fig. 3, so that the hinged frame C is here shown in front and the yoke B behind. Fig. 10 shows a modification desirable when a conduit-tube already laid requires strengthening, as by this form the frame and yoke C and B are inserted from opposite sides under and around the conduit already in the ground, and when matched together and bolted up and the conduit-tube bolted or riveted thereto the frame C may be adjusted to open or close the grip-slot R and fix it at any width desired. Fig. 10$^a$ shows a modification of the electric-wire conduit, in which the electric conductor D' is carried upon open brackets upon the yoke B, instead of through holes. Every alternate yoke constructed in this way will render the insertion or removal of the sections of which the electric-wire conduit is composed more easy. Fig. 11 shows the means whereby I expose to view the insulated electric conductors carried in the electric-wire conduit D', so as to draw certain wires therefrom or cut the connection with others. It also shows the connection I make with the man holes of the cable-conduit and the means whereby explosive gases escape into the man-hole or the cable-conduit, and are there diluted and rendered non-inflammable. This will best be seen by examining Fig. 11 in conjunction with Fig. 8. Fig. 12 is a modification of Fig. 11, in which a screw-connection is used for the sleeve D$^2$, instead of a simple sliding connection, as in Fig. 11, and is especially useful where a hermetically-sealed joint is required. Fig. 13 shows a double-flanged rib on the inside of the yoke B or frame C for the attachment by screws or rivets of the conduit-tube, so that the ends of the sections thereof shall lie flush against each other. Fig. 14 shows a single flange having the ends of the conduit-tube sections overlapped, (as in steam-boilers,) the cable traveling in the direction shown by the arrow. Fig. 15 illustrates the formation of the hinge-joint of the yoke B and frame C, so as to take the strain from the bolt E by the formation of a lug and countersink upon the adjacent sides of the frame and yoke surrounding the said bolt E. Fig. 16 is a view of the hinged frame C detached to show its construction in detail more clearly than could otherwise be done; and Fig. 17 is a view of a corrugated sheet-metal conduit-tube like that shown in Fig. 9, excepting that the corrugations here are vertical instead of longitudinal, as in Fig. 9.

Like letters refer to like parts in all the figures.

My invention relates to the construction of the conduit of a cable railway, such as is used for street traffic, in which the car, traveling above, derives its motion from a cable lying in a conduit beneath, the motion of the car being communicated from the cable through a slot in the conduit, in which travels a bar or gripping device connecting the said car with the said cable for purposes of propulsion.

It consists, in the first place, of a yoke and frame which support the sides of the conduit-tube, and are adjustable to each other by a hinged joint or pivot, so that the sides of the conduit-tube may be opened or closed with reference to each other, so as to open or close the grip slot through which motion is communicated from the cable or conductor below to the car above and firmly fix the said slot to the proper gage or width, as desired, or adjust the same at will; secondly, in providing the conduit and its frame with a bracketed or otherwise supported electric-wire conduit, in which the wires shall be insulated in a suitable tube or otherwise, and from which connection may be readily made with the electric wires or conductors at the man-holes or other entrance-passages of the said cable-conduit, so that the two conduits shall be mutually attached to each other and operated by the same system of man-holes, entrances, passages, &c., and in which explosive gases in or around said electric-wire conduits may be free to escape into the body of the cable-conduit and be diluted below the point of combustion therein, or carried therefrom by the traveling car or cable; thirdly, in the special devices for exposing and covering the conducting-wires contained in the said electric conduit and making connections by such devices in the said man-holes of the cable-conduit; fourthly, in the construction of the walls of the cable-conduit tube, whereby they are made stronger in proportion to their weight of metal, and are adapted to be moved upon each other more readily to open or close the grip-slot, and also, by the vertical corrugations, to have the conduit-tube formed of sheet metal into curves without the formation of open joints; and, finally, in the construction of the sheaves or rollers upon which the cable travels, (when propelling the cars by a continuous traveling cable,) and the coacting parts pertaining to the said sheaves, whereby a better, smoother, and steadier travel of the cable is secured, whipping of the sides of the conduit-tube and strain of the cable are greatly lessened, and wear and liability of breakage of the cables are much diminished.

Referring to the drawings, in Fig. 1 I show a side elevation, which will be more clearly understood by reference to Fig. 9. The sides of the conduit-tube are shown at A, A', $A^2$, $A^3$, and $A^4$. This tube is constructed of light sheet steel or iron similar to light boiler-plate, and is bolted or riveted to the flanged edges or inside rim of the yoke and frame, which surround and support it at suitable distances apart along the conduit, which may be from four to six feet in ordinary cases, varying with the weight of travel, the composition of the street dirt, and extremes of temperature.

The yoke B (shown in front view in Fig. 3) is made of solid cast-iron or similar material, and is cast flat with its edge to the conduit, so as to insure great rigidity under strain. It is provided with lateral arms B' B', springing out from the sides thereof to the width of the rails M M, Fig. 8, and provided with sockets $b\ b$, to receive the wooden stringers L L, upon which the rails M M are supported, the whole being firmly bolted in place. I do not provide these lateral arms B' B' with all the yokes, as every alternate one will suffice, and in some cases they may be dispensed with altogether. The yoke B consists of a broad bottom piece placed edgewise beneath the conduit-tube A, and provided with side pieces, of similar sectional form, extending up alongside the conduit-tube on each side. On one side, B' $B^4$, this side piece sustains one side and the overhanging roof of the conduit-tube, which is firmly bolted thereto, as is the bottom of the conduit-tube to the bottom piece of the yoke B. On the opposite, $B^6$, this side piece of the yoke B extends up alongside the movable side of the conduit-tube A', but sloping a little back therefrom to allow motion to and fro of the said side A' and firmly support the frame C, which is pivoted to and extends up alongside $B^6$, and is firmly clamped to the same by the bolt F, to be described. To this upright side $B^6$ the conduit-tube is not attached, its purposes being to support the frame C, the arm B', when such is used, and the electric conduit D'. The upright $B^6$ extends up to about the angle of the conduit-tube, where it bends inward to form the roof thereof, and there it terminates just above a bolt-hole, F'. (See Fig. 1.) At the angle formed by the upright $B^6$ and the bottom $B^5$ is another bolt-hole, $E^2$, to which is attached, by the bolt E, the frame C, which moves to and fro upon the bolt E as a pivot, and supports the third side of the conduit tube A' $A^3$, Figs. 4, 5, 8, and 9. The frame C, at the bolt-hole $E^2$, is provided with a boss, $c^2$, which is seated peripherally to the bolt-hole $E^2$ in a countersink, $b^2$, in the yoke B, in which it turns as upon a hinge, so that the strain of lateral resistance is entirely removed from the bolt E. This hinge E E' $E^2$, Fig. 15, is situated immediately beneath and outside the angle $a^2$ of the conduit-tube A, Fig. 4, so that a slight slip, if any, practically, is made at the corner of the conduit-tube occupied by the hinge. Such motion as occurs, however, is provided for by the internal longitudinal corrugation $a^2$, Figs. 4 and 9, which will play up and down very slightly as the grip-slot is closed or opened, or by the lipped and lip-seated joint made by the sides of the conduit-tube, as shown at $a^3$, Figs. 3, 5, and 6; or, if the sheet metal be light, the ordinary solid construction in one piece will answer every purpose. When I use the lipped joint shown at $a^3$, Fig. 5, I pack the joint with tar, rubber, or other water-proof substance, if desired.

The frame C is shown in Fig. 16 separated from its surrounding parts. It consists of a stiff upright flanged plate, of cast-iron preferably, to the flanged inner edge of which is bolted or riveted the movable side of the conduit $A^3$, having the overhanging part $C^4$ of the frame to correspond to the opposite overhanging side $B^4$, and form the two sides of the roof of the conduit separated by the grip-slot R. The frame C is provided at E', Fig. 16, with a bolt-hole of considerable size, to receive the bolt E, by which it is bolted against the side of $B^6$, so as to be adjustably pivoted thereto upon the boss $b'$ and countersink $b^2$, before described. Upon the frame C, nearly opposite the angle, is an elongated bolt-slot, $F^2$, curved upon E' as a center, and matched to the round bolt-hole F' of the yoke B, so that a bolt passing through the hole F' and slot $F^2$ will clamp the frame C against the side of the upright $B^6$ adjustably, as upon a hinge at E, in such manner that the upper part of the frame C, carrying with it the free side of the conduit-tube, may be moved outward and inward along the slot $F^2$ to the extent thereof, whereby the upper part of the conduit-tube upon one side will approach to or recede from the opposite side thereof, and correspondingly close or open the grip-slot R. The bolt F clamps the sides of the frame C and the upright $B^6$ firmly against each other and fixes the width of the grip-slot until changed by releasing the bolt F, which is readily done by removing one or two stones from the street-paving, when, by means of a jack or a drift, the grip-slot may be set to another gage and the bolt F be again tightened up.

The conduit when first put together in the shop does not require the nice adjustment required when the parts are riveted up as made to a non-adjustable gage of grip-slot, as is the case with those in ordinary use; nor does it give opportunity to workmen to make forced joints and adjustments of gage, which will slip, draw, or otherwise change when in the ground and under strain, the parts in my invention being made separately and set up by any workman to the proper gage required.

To prevent slipping of the side of the frame C upon that of the upright $B^6$, which is unlikely in any case to occur if the parts be firmly bolted together, a rust-joint being formed, I roughen the adjacent faces of C and B, or corrugate them, as shown at $C^6$ in Fig. 3, with a series of fine vertical lines, so that they may interlock with each other, and a nut-lock may be used to hold the nut from slipping upon the bolt.

It will now be seen that one side of the conduit $A'$ $A^3$ is hinged upon the bottom and the opposite side, and the grip-slot is fully under control from the street-surface. For the guard-rails, which lie alongside the grip-slot R and protect the same, I prefer to use the safety devices patented to me under Letters Patent of the United States No. 307,766, dated November 11, 1884, which are of great value in connection with such cable-railway conduits when laid in the streets of cities, &c.; but any form of guard-rail may be used to suit the requirements or convenience of the road. As shown in Fig. 2, these guard-rails rest upon the flanged top plates, $b^5$ and $c^5$, of the yoke B and frame C, these surfaces being flattened and extended out from the grip-slot R, to enable them to be bolted thereto and extended thereupon. While the said guard-rails may be attached directly to the upper edges of the sides of the conduit-tube in the construction shown by supporting them upon the plates $b^5$ $c^5$, in which the frame C and yoke B terminate, they are securely held, and may be set inward or outward, as desired, in accordance with the principles set forth in my Letters Patent No. 307,766 aforesaid, in which the method of making the guard-rails laterally adjustable is fully described and claimed.

While a heavier guard-rail may be required when only supported at intervals, yet, as all vertical strain is taken from the conduit-tube, the latter may be made correspondingly lighter, so that economy need not be sacrificed. The top edges of the conduit-tube should come up flush with the guard-rails R' R' in any case, or overlap and rest against them, to prevent ingress of dirt and support their tops against inward pressure.

The sections of conduit, including yokes and frames, are made and set up complete, and placed in the ground end to end. I prefer to make them in lengths of from twelve to eighteen feet or more, having one yoke and frame flush with one end of each section, another, without the projecting arms B' B', at a distance of from four to six feet therefrom, and a third yoke and frame at an equal distance farther, beyond which the conduit-tube extends another like distance unsupported and ready to be bolted to the flanged opposite end of the adjacent section; or the sections may be made with a yoke and frame at each end thereof, and one or more, at proper distances apart, between. In such case I find it preferable to reverse the yoke and frame at one end of the section, so that the frames come inside the yokes, and the latter may come flush against each other and be firmly bolted up, to make a continuous conduit, by bolts passing through the flanged side and bottom plates.

The holes $b^3$ $b^3$, Figs. 3, 8, and 9, are merely to lighten the cast-iron yoke and frame, without impairing their rigidity, and may be of any shape, size, or number desired.

The arms B' B', which project from the sides of the yoke B, are adapted to support the stringers L L of the rails M M by means of the sockets b b, and rest upon a firm foundation, S S, if necessary, which may be made of stone or concrete without sinking to a greater depth than that of the bottom of the conduit, and by seating the stringers L L in the sockets b b the rails M M can neither close nor open upon the grip-slot or each other, which, when it occurs, is very destructive to the rolling-stock of the road.

The second part of my invention relates to the incorporation, with a cable-railway conduit, of a conduit or a series of conduits for electric wires, which are carried by the framework of the cable-conduit, and external thereto, upon brackets attached to the same, so that the electric conductors are readily accessible for repairs, introduction, or replacement of wires, or for drawing off wires to houses or other points along the line. For this purpose I provide the yoke B with a flanged hole, D, near its upper part, on one or both sides of the cable-conduit; or there may be a number of such holes, D, upon one or the other side for multiple conduits, which may be of any size from an inch or less in diameter upward. These holes D D D, when the sections of cable-conduit are in place, form a longitudinal series in which are placed an electric-wire conduit, D', Figs. 1, 2, and 8, containing one or more electric wires, d, Fig. 8, and which thus extend along the cable-conduit, external thereto, and supported upon the same yokes and occupying the same excavation. The hole in the frame C is elongated from side to side, to allow it to be adjusted without disturbing the electric-wire tube D', which rests in the hole in the upright B⁶, against which the frame C is bolted.

Instead of the holes D D, I sometimes use open brackets, as in Fig. 10ᵃ, or provide each alternate yoke B with an open bracket, so that the separate lengths of electric-wire conduit may be more readily introduced and screwed into the preceding length to form a continuous tube to carry the wires. I prefer, however, to use a drawn or forced leaden tube containing a group of individually-insulated wires, and I sometimes use one conduit for the direct and the other for a reverse current. I also use for the electric-wire conduit any form of tubing or piping—terra-cotta, vulcanite, boiler-covering, asbestos, tarred rope, lead, iron, wood, or other material—or use single wires of large caliber properly insulated.

Where the cable used in the cable-conduit for propelling cars is an electric instead of a traveling cable, I connect the outside electric conduits thereto, if desired, as feeders, equalizers, or safety-switches. The lengths of electric-wire conduit are united to each other in any ordinary manner, and at the man-holes of the cable-conduit I provide, at the same time, access to the electric wires, so that a single set of man-holes answers for both, as is the case with the brackets, frames, yokes, and the excavation in which it is laid. In Fig. 8 such a man-hole is shown. The yoke B is here expanded on one side, B², which, with the succeeding yoke, forms a box or chamber communicating with the interior of the conduit, and which is closed by a sheet-metal or other cover along the side b' and the bottom. This chamber extends across the cable-conduit, so as to expose the electric conduit, the opposite side of the box or chamber being formed by the side b⁶, shown in section.

The sheet-metal conduit-tube is interrupted at the points occupied by the man-hole boxes, so that free access may be had across the line of the same, the cable extending across the space occupied by the man-hole box being supported by sheaves or rollers in the conduit-tube at opposite sides of the said transverse box or man-hole, so that its travel is not interrupted, while it may be examined, as well as the electric-conduit tubes, which also extend across the said man-holes, by workmen or others, who obtain admission to the man-hole alongside the grip-slot R' from the surface of the street at N, N', and N², Fig. 8.

A cover, N, with a checked or corrugated surface closes the man-hole at the street-surface, and is provided with lips N', to extend under the guard-rail R', the outer side of the cover N² resting upon the edge of the box or chamber near the rail M. When the cover N is raised, entrance may be had to the chamber B², Fig. 8, and across the same to the electric conduit D', which extends across the man-hole in full view.

Instead of having the man-hole on the opposite side from the electric conduit, I sometimes make the entrance at the same side, or provide an entrance at each side.

The electric-wire conduit D', lying in the box or chamber B² of the man-hole, is provided with an external sliding section or sleeve, D², Figs. 11 and 12, which covers a segment of the exposed wires lying between the divided ends of the tube D' D', and perhaps a foot in length. In Fig. 11 this sliding tube or sleeve is provided with a set-screw, which being released, the tube may be slipped back so as to uncover and expose the group of insulated wires d, which, being properly indicated by color, material, or otherwise, may be connected or detached; or a wire may be carried out to a lamp-post, a dwelling-house, or elsewhere. In Fig. 12 this sleeve is attached to the disconnected ends of the tube D' D' by an internal screw at each end, one end of D' having a screw-threaded enlargement at the end thereof, so that when the sleeve D² is screwed back a few turns the sleeve may be slipped back, as in the other form shown in Fig. 11. The form shown in Fig. 12 is preferable where a hermetically-sealed joint is required from dampness or for purposes of insulation, &c.;

but I ordinarily prefer the simpler form shown in Fig. 11, or other equivalent means may be employed. The object of these sliding sleeves or covers D² is to enable the electric conduit or the cable to be approached without danger to the insulated wires or from accidental shocks therefrom in the ordinary repairs, examinations, &c., thereof. Except when carried under water or in damp situations where interruptions of the current might occur, I do not make these sleeves air-tight, but allow free communication between the ends of the sleeve and the conduit, through which wires may be drawn off to houses, factories, the main cable, or the traveling car itself, for purposes of illumination, conveyance of intelligence, &c. The occluded gases freely communicate with the main conduit through these spaces, which may be of any size or form desired, or may be simple open or exposed spaces, if desired, no sleeves being used unless such are required. While submerged or exposed to dampness I use air-tight screw or packed joints, as shown at Fig. 12, and carry the communicating wires (when such are used) through hermetically-sealed openings, the air-communication being secured at other and less exposed points. When required for communication with the cable or car, I do not always carry my electric conduit outside on brackets, but sometimes on suitable supports within the exterior lines of the cable-conduit, all the communications being the same, as well as the functions of the parts and their different purposes.

As the electric conduit lies very near the street-pavement, while fully protected by its support upon and nearness to the cable-conduit, it is obvious that it may be readily reached at any point by a little digging between the yokes B B along the route. It will be seen that any explosive gases formed by the union of illuminating-gases escaping into the ground with occluded atmospheric air, and likely to be exploded by an electric spark arising from imperfect insulation, will flow into the cable-conduit at the man-holes, and be largely diluted therein, and thence escape by diffusion through the grip-slot, being also constantly stirred up and expelled by the traveling cable and the gripping-blocks, &c., of the car.

In the fourth place, I construct the sides of my sheet-metal cable-conduit tube of corrugated metal, though plain may be employed, if desired; but I secure special lightness of metal and great resistance by my corrugated sheet-metal conduit, and also secure other advantages. At $a$ $a$ $a$, Fig. 9, I show a series of longitudinal corrugations, which assist in equalizing the strain upon the conduit due to the adjustment of the frame C upon the yoke B, as the corrugations yield under pressure more readily than plain metal would do, while they are stiffer as a whole. The corrugation $a^2$ is especially useful to take up this strain, as it occupies the corner near the center of motion E, and forms a flexible joint, as before described. Where great extremes of temperature are met with, in order to compensate for shrinkage and expansion, I provide certain sections of my cable-conduit with the vertical crimps or corrugations $a'$ $a'$ $a'$, as shown in Fig. 17, and these fully compensate, by their closing and opening, for any possible expansion or contraction, and steady and stiffen the shell A against side pressure. In turning curves I use the vertical corrugations $a'$ $a'$ $a'$ to effect any curvature of the conduit-tube required, which I accomplish by crimping or corrugating one side of the sheet-metal conduit-tube more deeply or at closer intervals than the other, which will contract that side more than the other and draw the conduit into a curve, as is well known, of greater or lesser radius. By this means I avoid the use of cast-iron shells for the curves, and produce a cheaper, lighter, and stronger curve than has heretofore been done. In Fig. 17, also, are shown two varieties of vertical corrugations—one continuous and the other broken. The latter enables the crimps to be so placed as to give vertical instead of horizontal curvatures to the conduit-tube, which are often extremely desirable, the crimping of the top parts elevating the ends of the section, and of the bottom parts depressing them.

The last part of my invention relates to the construction and relative adaptation of the sheaves or rollers upon which the traveling cable runs and is supported, except when held up by the gripping-bar of the car, which travels above and out of reach of the said sheaves or rolls. Instead of a simple grooved pulley extending transversely across the cable-conduit, the groove being adapted to receive the cable, I provide a pair or group of three or more opposite and diagonally-placed elongated sheaves or rolls, H H', (see Figs. 3 and 7,) which, crossing each other at their lower ends, are flanged or swelled out, something like the bobbins used in spinning-mules, so that their surfaces, where impinged upon by the traveling cable, may present a rounded seat formed by the flanges of the two opposite sheaves, the rollers extending upward and outward until they lose themselves in the brackets in which their upper spindles are seated, in contact with the sides of the conduit-tube. This construction gives the entire width of the conduit as a rolling-surface, in such way that the cable, rotating at any part, is thrown toward the center of the conduit by the centrifugal force developed by the sheaves when rotating, and the cable also tends to slide down by gravity to its seat at the intersection of the upper surfaces of the opposite sheaves. In Fig. 7 I show a group of three of these sheaves or rollers, and in Fig. 3 a single pair in end view. As the cable lies in the hollow formed by the expansion or swell at the lower parts of the rolls, where their top surfaces cross each other, it is prevented from being thrown upward, as is done by the flanged sides of a single-grooved pulley, as in the ordinary construction, for the flanged sides of the grooves in such construction being farther from the center of rotation than the bottom of the groove, according to the well-known law, the cable tends to rise and be thrown off by friction against these flanged sides, and also grinds and chafes against them when running at the bottom of the groove, on account of the variable lineal motion between the bottom and the sides of the groove, as before explained. Besides, when the switching of the cable from side to side in the conduit throws the cable out of the grooves, a new motion has to be communicated to the large and heavy grooved pulley at each new contact, so that in the aggregate considerable power is wasted, which is not the case with the diagonal sheaves used in this invention. It is also difficult to keep the horizontal bearings lubricated, being out of reach, while with my diagonal rolls the point to be lubricated is at the bottom upon the lower spindle, which being stepped or partially stepped into its bearing will not allow the lubricant to escape. In slight curves of the line, moreover, the diagonal rolls support the cable at such height along their axes as will hold the cable in equilibrium, which is not the case in the ordinary horizntal grooved pulley. The action in this case is in accordance with the principle of automatic adjustment used in the wheels of car-trucks, where, in turning a curve, the trucks run outside until the bevel of their flanged tires brings the centrifugal force into equilibrium, when the travel is steady upon the new line of curve, and so automatically for each change of direction. Were it not for this, railroad-cars would jolt about from side to side with every change of direction and be liable to be thrown from the track at every oscillation, being held only by flanges upon the wheels. As the lines of the surfaces of the upper sides of my diagonal sheaves are prolonged by the brackets K K' entirely out to the sides of the conduit-tube, there is no place for the cable to rest out of contact with the rotating rolls, so that it is not liable to have its surface torn or to be broken by catching against obstructions. I seat these rolls or sheaves H H' at their lower ends in a single bearing or bracket, I, which is prolonged upward along one side of the conduit-tube to form a bracketed support to receive the journaled block K⁴. (See Figs. 3 and 3ᵇ.) This bearing I is firmly bolted to the yoke B through the sheet-metal conduit-tube A both at its bottom and its side. It is provided with two or more stepped seats, $i\,i$, in which the spindles $h'\,h'$ are seated and rotate. At its upper part it is provided with a ribbed extension, K, having two projecting ribs, K² K², Fig. 3ᵃ, united at the back by a plate, through which it is bolted to the yoke B before the block K⁴ is inserted. These ribs K² K² spring from the side of the conduit-tube, (see Fig. 3ᵃ,) and conform to the upper line of the sheaves or rolls H H'. The steps $i\,i$ are provided with enlargements at their upper part to hold a considerable quantity of lubricating material, which is thus in constant contact with the frictional surfaces of the spindles $h'\,h'$. Between the ribs K² K², Fig. 3ᵃ, is a triangular block, K⁴, provided with a bearing for the upper spindle, $h$, of the sheave H. This block K⁴ is adjusted between the ribs K² K², and is held in place by the cross-bolt K³, which passes through the ribs K² K² and the block K⁴, and is made adjustable by an elongated bolt-slot in K⁴ or K² K², or otherwise, if desired. At the opposite side the upper spindle or spindles are supported by a similar ribbed bracket and block bolted through the conduit-tube to the frame C and independent of the bracket I, so that the adjustment of the grip-slot R may be made without interference from the sheave brackets or supports. As the bearings in the blocks K⁴ K⁴ have but little weight to sustain, comparatively, there is little wear upon them, and they may be made to run in babbitt; or the bearings may be reversed and the blocks K⁴ K⁴ be provided with projecting journals and the upper ends of the sheaves H H' with recessed bearings, in which the lubricant may be contained, as in the steps $i\,i$ beneath.

The sheaves H H' are made of chilled iron or case-hardened or chilled steel, and the seats may be of brass, babbitt, or hard wood.

In Fig. 10 is shown a modification of the yoke B and frame C, to adapt them to be applied to a conduit-tube already in place in the ground, by digging down at the sides of the conduit between the car-tracks at proper distances and inserting the yokes and frames from opposite sides, the conduit-tube being then bolted thereto, and proper adjustment of the grip-slot made by means of the bolt F, as before, upon the hinged bearing E. The two parts B and C in this modification are made substantially similar in general form, but are reversed when applied. They consist of two right-angled frames, of cast-iron, overhanging at the top to match against the roof of the conduit-tube alongside the grip-slot R. When laid upon each other reversed, the two bottom plates will lie flatwise against each other, one rising a little higher in its upper flange to support the bottom of the conduit-tube and permit motion for adjustment upon the part of the other plate or frame, C. The uprights rise alongside the conduit-tube, and are then pushed together, so that the boss $c^2$ will enter the recess $b^2$ and be bolted together by the through-bolt E to form a pivot or hinge. The bolt F now being passed through the bolt-hole F' in the yoke part B, and the elongated bolt-slot F² in the frame C, the sides of the conduit-tube, when bolted to the flanged sides of B and C, may be adjusted and fixed by the bolt F to set the grip-slot R to any desired gage.

It is obvious that subsequent adjustments, after the ground is filled in, will be more difficult in this form, and should such be likely to become necessary I provide a vertical screw or handle and change the form or direction of the adjusting-bolt F and its seats in any well-known manner.

Having now described my invention, what I claim, and desire to secure by Letters Patent, is—

1. In a cable-railway conduit, the combination of the fixed yoke B and adjustably-pivoted frame C, substantially as and for the purposes described.

2. The combination of the fixed yoke B, having attached thereto the bottom $A^2$, side A, and inwardly-sloping top, $A^4$, of a sheet-metal conduit-tube, the frame C, pivoted to the said yoke at E, and having attached thereto the side $A^3$ and sloping top $A'$ of the said conduit, together with the adjustable attachment F F' $F^2$, by means of which the said frame and the said yoke may be clamped together or adjusted upon the said pivot E to open or close the grip-slot R, substantially as described.

3. In a cable-railway conduit, the series of yokes B B B, supporting the bottom and one side of a sheet-metal conduit-tube, in combination with the series of opposite frames C C C, hinged upon the said yokes at E E E, near the lower angle of the said conduit-tube, and having the flat sides of the said frames and the said yokes brought into apposition with and firmly held against each other by the bolts F F F, so as to adjust the sides of the different sections of which the conduit is composed upon each other by opening or closing the grip-slot R to a proper gage and screwing up the said bolts F F F to firmly clamp the said yokes B B B against the said frames C C C, substantially as described.

4. In a cable-conduit, the rigid yoke B, consisting of the bottom $B^5$, the upright provided with slope $B^4$, and opposite upright $B^6$, and having the bolt-holes $E^2$ and $F'$, in combination with the frame C, consisting of the upright provided with slope $C^4$, and having the bolt-hole $E'$ and bolt-slot $F^2$, or their equivalents, together with the pivot-bolt E and clamping-bolt F, the whole constructed to operate substantially as and for the purposes set forth.

5. A cable-railway conduit consisting of a series of rigid yokes and frames, B B B, C C C, supporting internally thereto a continuously-corrugated sheet-metal conduit-tube, substantially as described.

6. A sheet-metal conduit-tube for cable railways, consisting of the sides A, $A'$, $A^2$, $A^3$, and $A^4$, and having the flexible longitudinal corner corrugation $a^2$, or its equivalent, substantially as and for the purposes described.

7. In combination with a rigid yoke, B, supporting internally thereto the fixed sides of the sheet-metal conduit tube A $A^2$ $A^4$, an adjustable frame, C, pivoted upon the said yoke and supporting internally thereto the movable sides $A^3$ $A^4$ of the said tube, the side $A^3$ being adjusted upon the bottom $A^2$ of the said tube by a flexible closed joint, $a^3$, substantially as described.

8. In combination with a cable-railway conduit provided with suitable brackets or supports, one or more electric-wire conduits supported upon said brackets, said conduits communicating with each other and forming a compound conduit, substantially as described.

9. In combination with a cable-railway conduit having man holes $B^2$ at suitable intervals, an electric-wire conduit external thereto and connected with the said man-holes, so that both cable and electric conductors communicate freely and are both accessible therefrom, substantially as described.

10. A conduit for electric wires, consisting of a containing tube, $D'$ $D'$, and one or more insulated electric conductors contained therein, the ends of the said tube $D'$ $D'$ being permanently separated from each other, so as to expose the said wire or wires and covered by a freely-sliding sleeve, $D^2$, adapted to be held in place, so as to complete the tube, or to be slipped back upon and externally to the tube $D'$, to expose the said wire or wires and make or break connection therewith, substantially as described.

11. In a cable railway, in combination with a cable-conduit having an open grip-slot, R, and a traveling cable, G, adapted to propel the car above by connection made from the said cable with the said car through the said grip-slot, the elongated opposite and diagonally-placed rollers, upon which the traveling cable is supported and guided in the angle formed by the intersection of the upper and opposite rotating surfaces thereof, substantially as described.

12. The opposite diagonal sheaves or rollers H H' $H^2$, arranged alternately in pairs or groups of three or more at suitable intervals to sustain the traction-cable G at the angle of intersection of the said opposite and diagonal sheaves, or upon a single sheave of the said pair when the cable rises upon one or the other side of the same, substantially as described.

13. The tapering diagonal sheaves or rollers H H', enlarging in diameter from above downward, supported at their upper ends by the spindles or bearings $h\ h$ in the sockets K K' at opposite sides of the conduit or path of the cable A, and provided at their lower parts with the enlarged heads $H^3$ $H^3$, so constructed as to present by their intersection in longitudinal view a curved channel for the cable G, and sustain and steady the same against lateral whipping thereof and smoothly seat the said cable by gravity in the said angle formed by the surfaces of the said opposite sheaves after the passage of the grip-bar of a car and the lifting of the cable thereby, substantially as described.

14. In combination with the diagonal sheaves or rollers H H', the stepped seats $i\ i$, adapted to contain lubricating material, in which the spindles $h'\ h'$ are seated, and the opposite and upper journal blocks or bearings, K K', in which the spindles $h\ h$ are seated, substantially as described.

15. In combination with the conduit-tube A of a cable railway and the cables G, the opposite diagonal sheaves or rollers H H' and the beveled brackets K K', fixed to the opposite sides of the said conduit-tube, and in which said brackets are journaled the upper spindles of the said sheaves H H', the whole being so constructed that the cable G, if displaced to the side of the conduit-tube A, will slide down upon the beveled brackets K K' and the rotating sheaves H H', and be smoothly centered at the axis of intersection of the said diagonal rolls or sheaves, substantially as described.

16. In combination with the conduit of a cable railway having a grip-slot provided with adjustable sides so constructed as to enable the width of the said grip-slot to be altered or regulated by the lateral adjustment of one or both of the said sides, the yokes B B B, supporting internally thereto the sheet-metal conduit-tube A, and having the projecting arms B' B' springing from the sides of B between the bottom and top of the said yoke, and provided with the socketed seats $b\ b$, in which are supported the stringers L L of the rails M M, substantially as described.

17. In a sheet-metal conduit-tube for a cable railway, in combination with the yokes B B, grip slot R, and traveling cable G, the vertical crimps or corrugations $a'\ a'\ a'$ in said conduit-tube, by means of which the tube is stiffened, and at the same time compensates for expansion or contraction of the continuous line of conduit when the said vertical crimps are placed at intervals, and by varying the relative depth or number of crimps on opposite sides of the said conduit-tube the same may be curved along its course, substantially as described.

18. In combination with the sheaves H H', the double-leaved brackets $K^2\ K^2$, the interposed adjustable journal-block $K^4$, and the cross-bolt $K^3$, substantially as shown and described.

ISAAC W. HEYSINGER.

Witnesses:
P. O'DONNELL,
F. L. ROEPKE.